(12) United States Patent
Bedert et al.

(10) Patent No.: US 7,677,373 B2
(45) Date of Patent: Mar. 16, 2010

(54) LOCK-UP CLUTCH CONTROL METHOD

(75) Inventors: Jan A. Bedert, Oostduinkerke (BE); Filip D. Schacht, Roeselare (BE); Mark R. J. Versteyhe, Oostkamp (BE)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 529 days.

(21) Appl. No.: 11/809,335

(22) Filed: May 31, 2007

(65) Prior Publication Data

US 2008/0296111 A1    Dec. 4, 2008

(51) Int. Cl.
*F16H 61/14* (2006.01)
*F16H 45/02* (2006.01)

(52) U.S. Cl. ........................... 192/3.29; 192/3.3

(58) Field of Classification Search ............... None
See application file for complete search history.

(56) References Cited

U.S. PATENT DOCUMENTS

| 4,448,293 | A | * | 5/1984 | Maeda ........................ 192/3.3 |
|---|---|---|---|---|
| 4,450,941 | A | | 5/1984 | Morris |
| 5,701,982 | A | * | 12/1997 | Nakatani et al. ............. 192/3.3 |
| 5,755,638 | A | * | 5/1998 | Suzuki ........................ 477/62 |
| 5,819,896 | A | | 10/1998 | Fallu |
| 6,056,094 | A | | 5/2000 | Sakai |
| 2005/0211523 | A1 | | 9/2005 | Takahashi |

FOREIGN PATENT DOCUMENTS

| EP | 1 348 889 A2 | 3/2003 |
|---|---|---|
| JP | 62-233561 A * | 10/1987 |
| KR | 2004006979 | 1/2004 |
| WO | WO 2006/017902 A1 | 8/2005 |

* cited by examiner

*Primary Examiner*—Richard M. Lorence
(74) *Attorney, Agent, or Firm*—Marshall & Melhorn, LLC

(57) ABSTRACT

A torque converter lock-up clutch may be controlled by a lock-up clutch regulator control valve. The valve is utilized to selectively direct a fluid to the torque converter or to a pressure regulator valve. For example, in a hydrodynamic condition of the torque converter, the valve permits fluid to flow to the torque converter. In a lock-up condition of the torque converter, the valve directs fluid to a pressure regulator valve which selectively permits pressure to build in the torque converter.

17 Claims, 6 Drawing Sheets

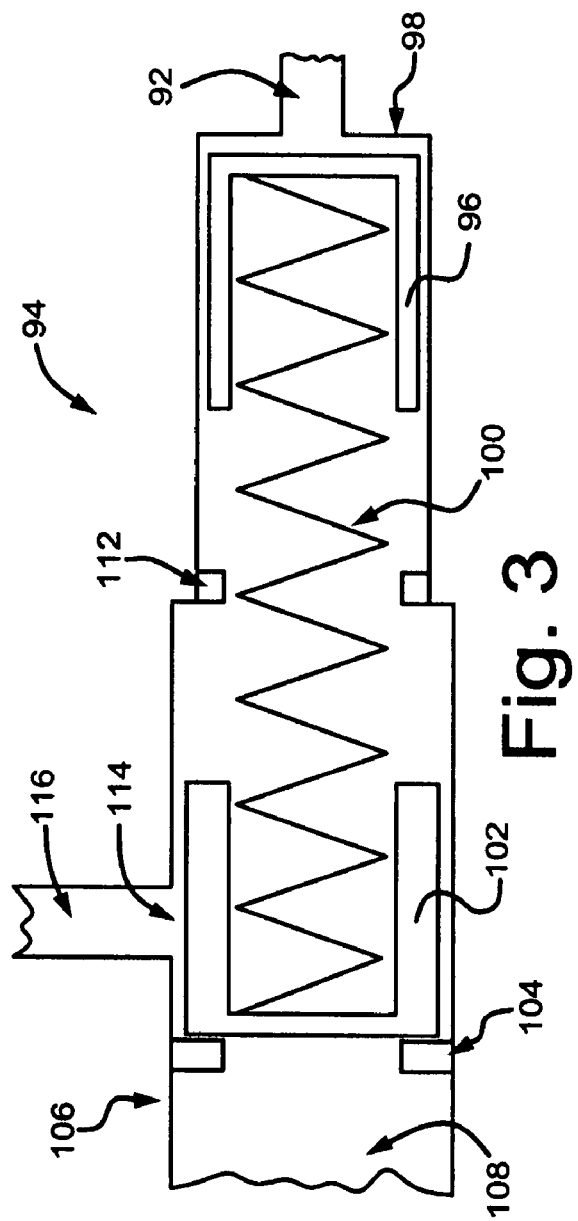
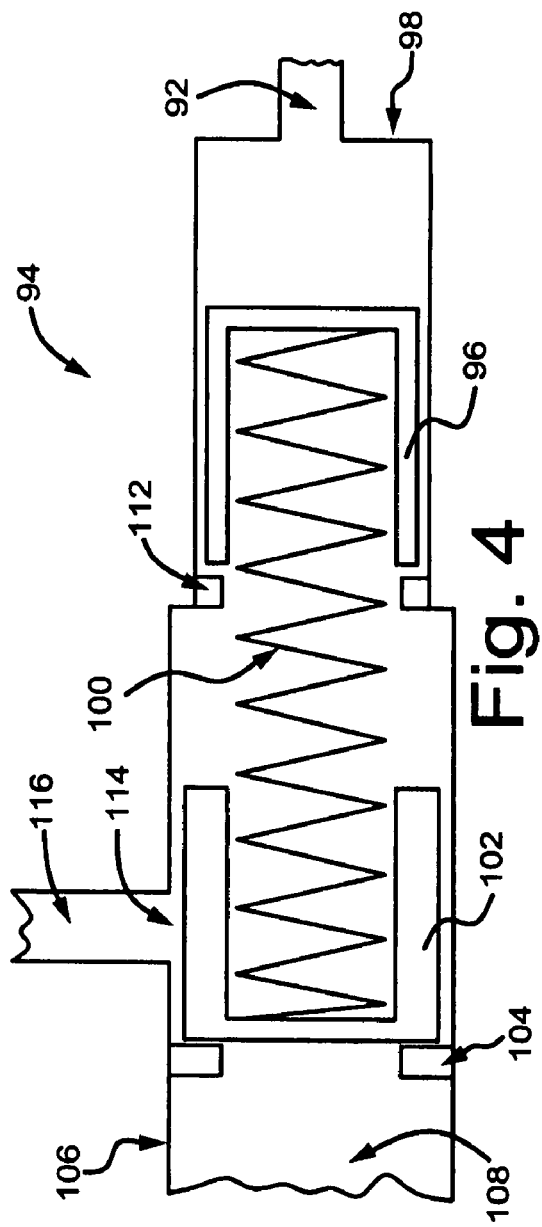

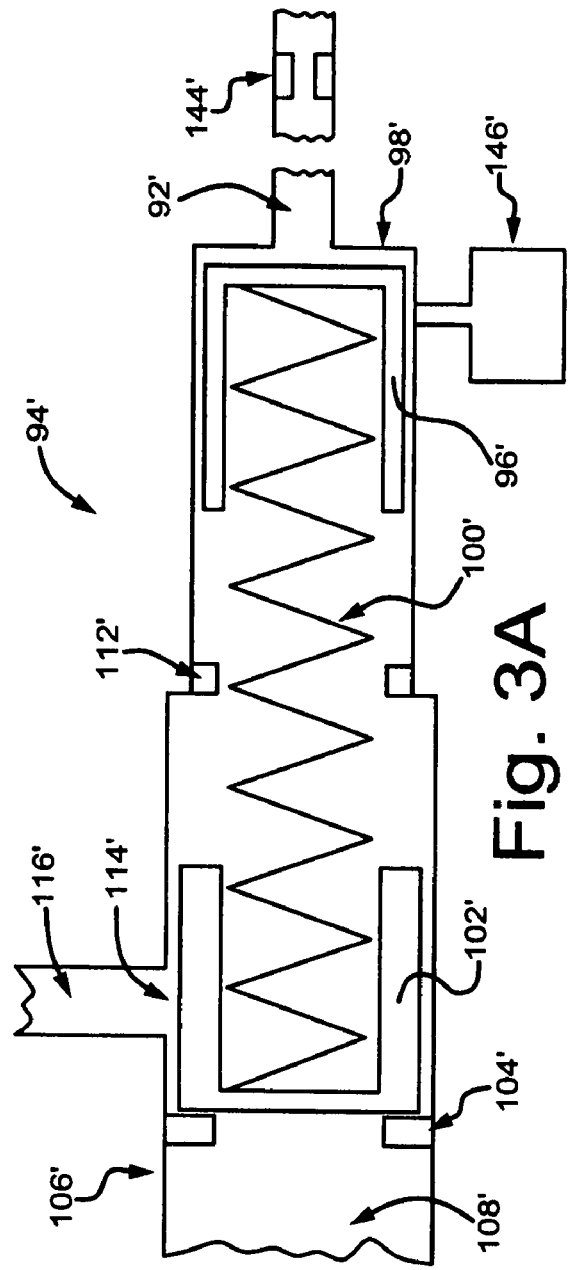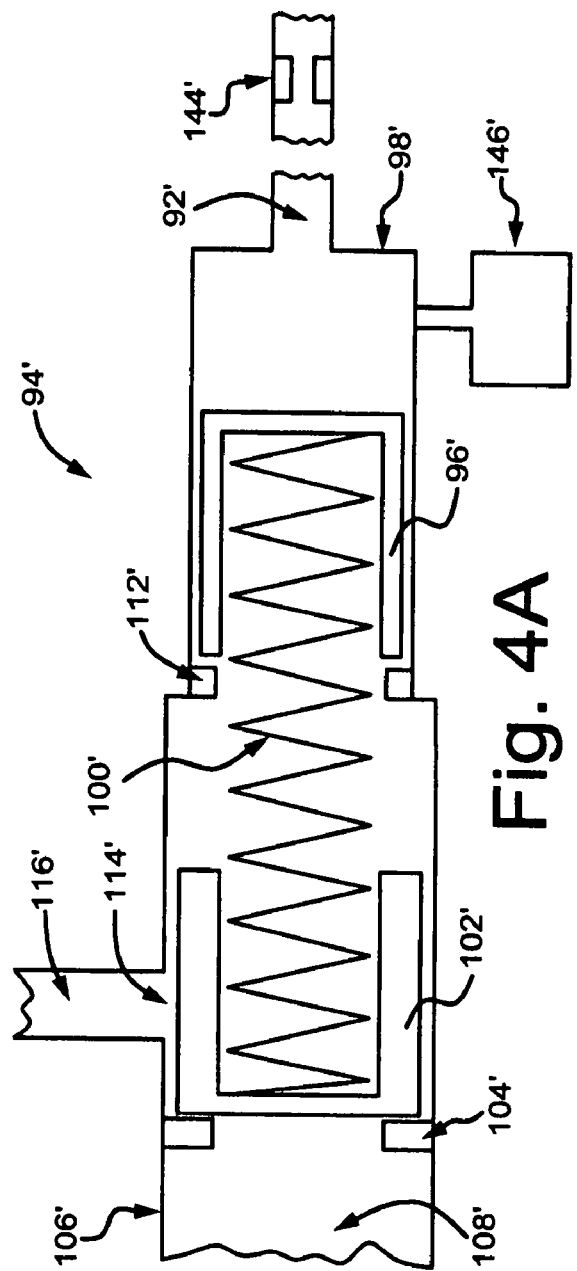

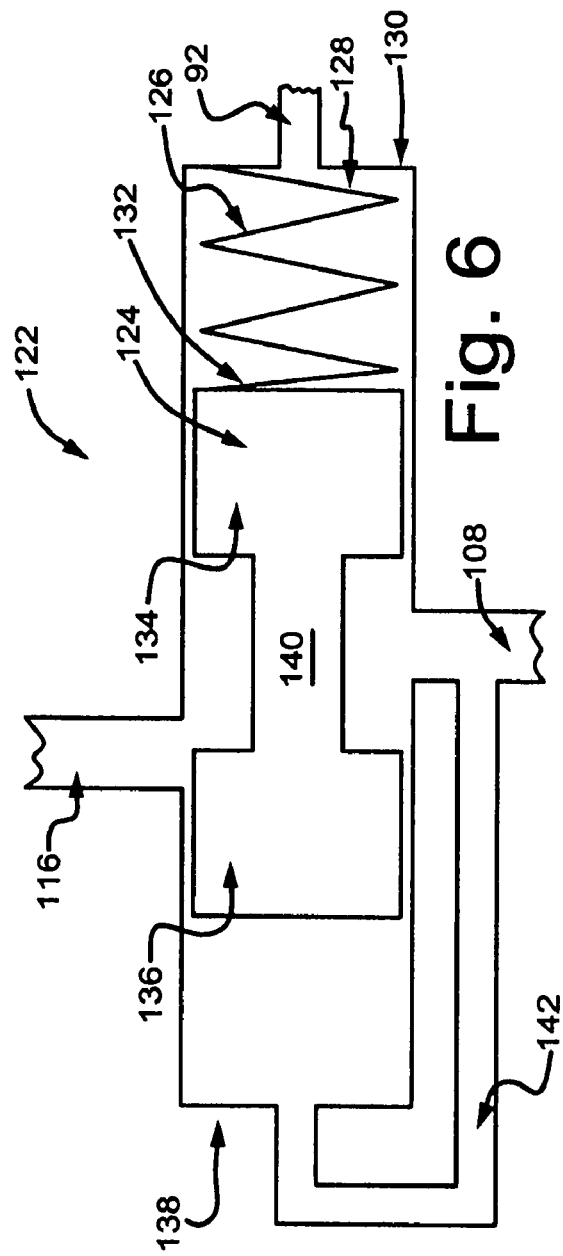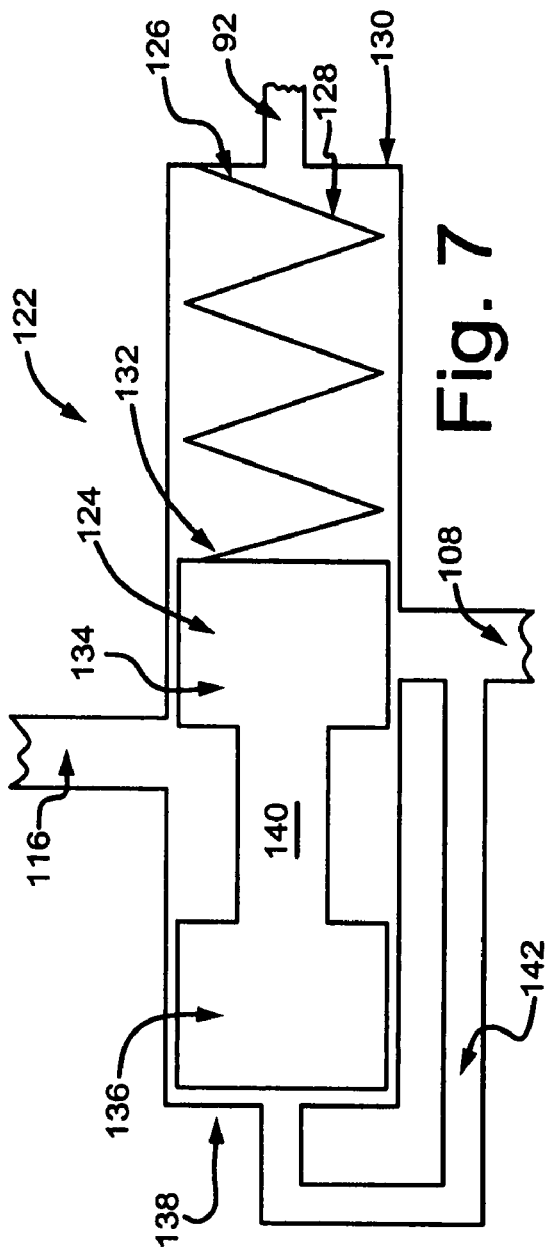

LOCK-UP CLUTCH CONTROL METHOD

FIELD OF THE INVENTION

The present invention relates to a method for controlling a lock-up clutch in a torque converter for a transmission.

BACKGROUND OF THE INVENTION

Torque converters that can selectively lock-up are needed as consumers demand machines that operate at higher efficiency and higher performance. A lock-up torque converter may increase the efficiency and performance of a machine particularly at high operational speeds of the machine.

Typically, a lock-up torque converter has a lock-up plate. The plate is attached at one end portion to the turbine. At the other end of the plate, a friction-type lining, or a clutch system, is provided. The friction-type lining of the plate, or the clutch system, is selectively located in contact with the impeller cover of the torque converter to selectively lock the turbine to the impeller cover. In this manner, torque can be transferred directly from the engine to the turbine shaft and the torque converter function is bypassed.

There are various known methods to control a lock-up torque converter. In one known method, known as a two line method, fluid enters the torque converter between the power-take-off (PTO) shaft and the turbine shaft; fluid leaves the torque converter between the impeller and the stator. When the lock-up plate is engaged, this flow direction reverses.

The two line torque converter has the advantages of utilizing inexpensive parts and being inexpensive to manufacture. The two line torque converter suffers, however, from being difficult to cool down in certain designs and requiring a complex control system.

Open two line torque converters are also known. During hydrodynamic operation of these torque converters, fluid enters the torque converter between the stator and the impeller and between the impeller cover and the lock-up plate. Fluid leaves the torque converter between the stator and turbine. The lock-up plate can be used as described above with the two line torque converter.

Three line torque converters are also known. These torque converters can be disadvantageous as they are have more complex hardware than the two line systems but they can be more easily controlled.

Thus, it would be advantageous to have a two line system that utilizes the relatively simple hardware of the two line system, which is easy to control and which provides optimal function for the complete work range of the torque converter.

SUMMARY OF THE INVENTION

In one disclosed embodiment for a method of controlling a torque converter lock-up clutch, fluid is provided to a lock-up clutch regulator control valve. The lock-up clutch regulator control valve is utilized to selectively direct fluid to a torque converter or to a pressure regulator valve. When the fluid is directed to the torque converter, a hydrodynamic condition in the torque converter is achieved in which a lock-up clutch plate in the torque converter is prevented from engaging with an impeller housing of the torque converter. When the fluid is directed to the pressure regulator valve, the pressure regulator valve causes pressure in the torque converter to increase to urge the clutch plate into engagement with the impeller housing.

BRIEF DESCRIPTION OF THE DRAWINGS

The above, as well as other advantages of the present invention, will become readily apparent to those skilled in the art from the following detailed description when considered in the light of the accompanying drawings in which:

FIG. 3 is a schematic, cut-away side view of one embodiment of a pressure regulator valve in one condition;

FIG. 3A is a schematic, cut-away side view of another embodiment of the pressure regulator valve in one condition;

FIG. 4 is a schematic, cut-away side view of the pressure regulator valve of FIG. 3 in another condition;

FIG. 4A is a schematic, cut-away side view of the pressure regulator valve of FIG. 3A in another condition;

FIG. 6 is a schematic, cut-away side view of another embodiment of a pressure regulator valve in one condition; and FIG. 7 is schematic, cut-away side view of the valve of FIG. 6 in another condition.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
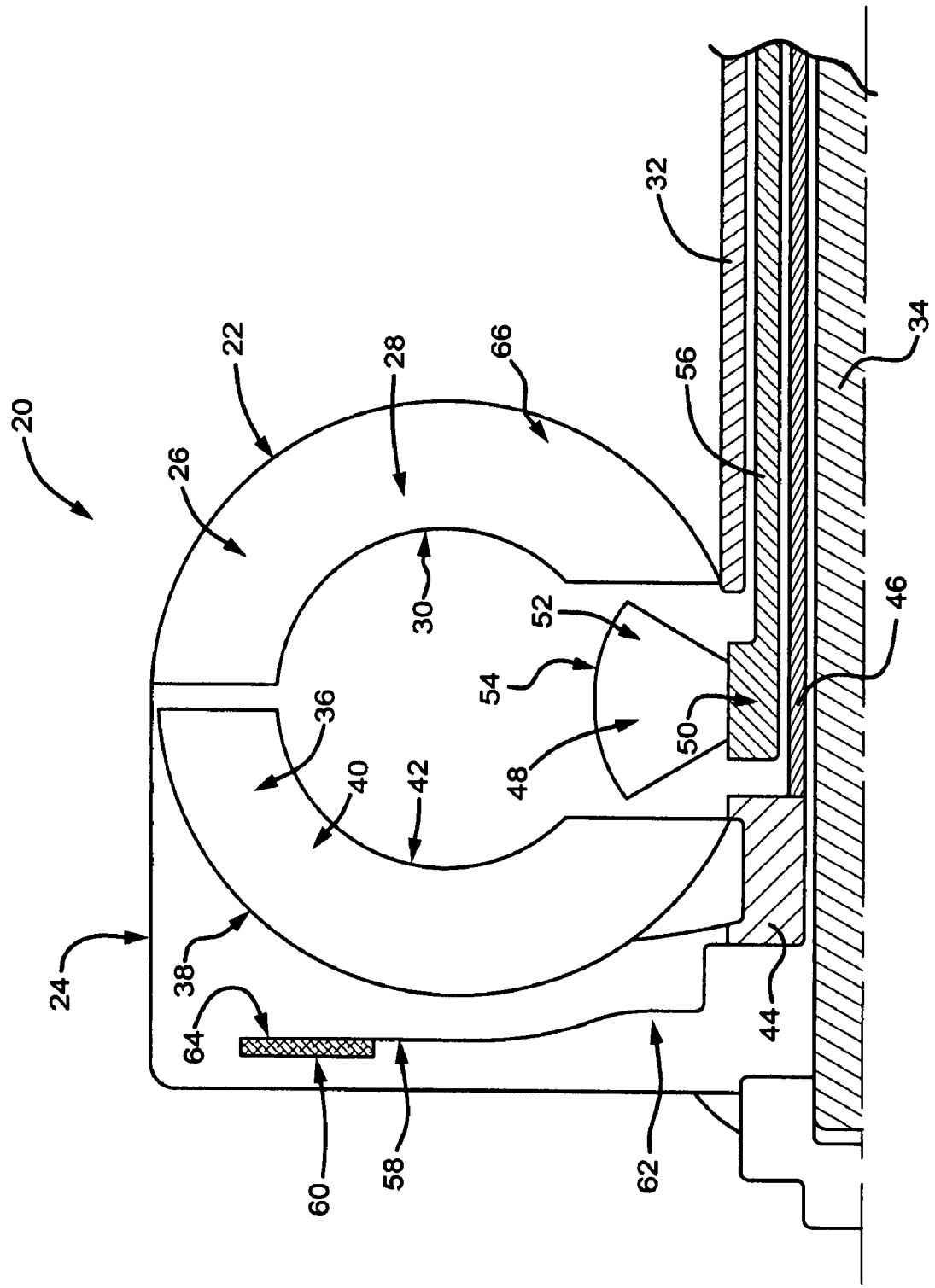
FIG. 1 is a schematic view of one embodiment of a torque converter.

Referring now to FIG. 1, a portion of a torque converter 20 is schematically depicted. The torque converter 20 has an impeller housing 22 and an impeller cover 24. The impeller housing 22 and the impeller cover 24 are connected together. The impeller cover 24 is typically connected to a source of rotational power (not shown), such as, but not limited to, an internal combustion engine. Typically, the impeller cover 24 is located adjacent to and connected to the flywheel (not shown) of the source of rotational power.

Impeller blades 26 are connected to the impeller cover 24 and inwardly depend therefrom. An inner edge portion 28 of the impeller blades 26 may be connected to an impeller shroud 30. The impeller housing 22 has a hub 32. A power-take-off (PTO) shaft 34 can be connected to the impeller cover 24. The PTO shaft 34 provides rotational power to devices that need such power from the source for rotational power.

Turbine blades 36 are attached to a turbine housing 38 within the torque converter 20. An inner edge portion 40 of the turbine blades 36 may be attached to a turbine shroud 42. The turbine housing 38 is secured to a turbine hub 44. The turbine hub 44 is connected to a turbine shaft 46. The turbine shaft 46 may be hollow and contain the PTO shaft 34. The turbine shaft 46 may be connected to the transmission (not shown) of a machine or vehicle.

A stator 48 is attached to a stator hub 50. An inner edge portion 52 of the stator 48 may be secured to a stator shroud 54. The stator hub 50 is connected to a stator shaft 56. The stator shaft 56 may be hollow and contain both the turbine shaft 46 and the PTO shaft 34. The stator 48 may be fixed or it may rotate within the torque converter 20.

A lock-up plate 58 is located within the torque converter 20. The lock-up plate 58 has a first end portion 60 and a second end portion 62. The first end portion 60 has a friction portion 64, such as friction lining. The second end portion 62 is attached to the turbine hub 44. The lock-up plate 58 can move axially such that the first end portion 60 may be selectively biased toward, and located in selective contact with, the impeller cover 24. It is also within the scope of the invention for the first end portion 60 to comprise a clutch with steel separators, fixed to the impeller, with rotating discs therebetween, fixed to the turbine (not shown).

Fluid, such as oil, is permitted to selectively flow into and out of the torque converter 20. For example, oil enters the torque converter 20 between the stator 48 and the impeller blade 26 as well as between the impeller cover 24 and the lock-up plate 58. Typically, a larger amount of oil is entering the torque converter 20 between the stator 48 and the impeller blade 26 as compared to the amount of oil entering between the impeller cover 24 the lock-up plate 58.

Oil pressure, combined with centrifugal forces, moves oil from the approximate center of the impeller blade 26 to an outer diameter 66 of the impeller blade 26. At the outer diameter 66 of the impeller blade 26, the oil leaves the impeller blade 26 and contacts other parts within the torque converter 20, such as the turbine blade 36. In the turbine, oil is pushed to the center of the turbine blade 36. At the center of the turbine blade 36, oil is pushed through the stator 48 where it will join new oil entering the torque converter 20.

A portion of the oil exits the torque converter 20 between the turbine blade 36 and the stator 48. A regulator valve, described below, may be located at the outlet of the torque converter 20 to ensure the torque converter 20 maintains sufficient internal pressure to operate correctly.

The above may be characterized as a hydrodynamic mode or condition of the torque converter 20. Those skilled in the art will appreciate that the stator 48 functions as a torque multiplier in this mode and particularly when the machine or vehicle is not operating at a high speed.

In some cases, such as when the machine or vehicle is operating at a high speed, the torque converter 20 may become less efficient as the stator 48 no longer effectively functions as a torque multiplier. Instead, the stator 48 may be creating power losses in the torque converter 20 because it may be disrupting a preferred oil flow. Thus, at high operational speeds, it may be preferably to exclude the torque converter 20.

The torque converter 20 may be excluded by coupling the impeller blades 26 with the turbine blades 36. It can be appreciated from the foregoing that this can be accomplished by urging the lock-up plate 58 into contact with the impeller cover 24. When the impeller blade 26 is coupled to the turbine blade 36, power from the engine can be transmitted into the transmission with only minimal torque converter 20 losses.

Figure 2:
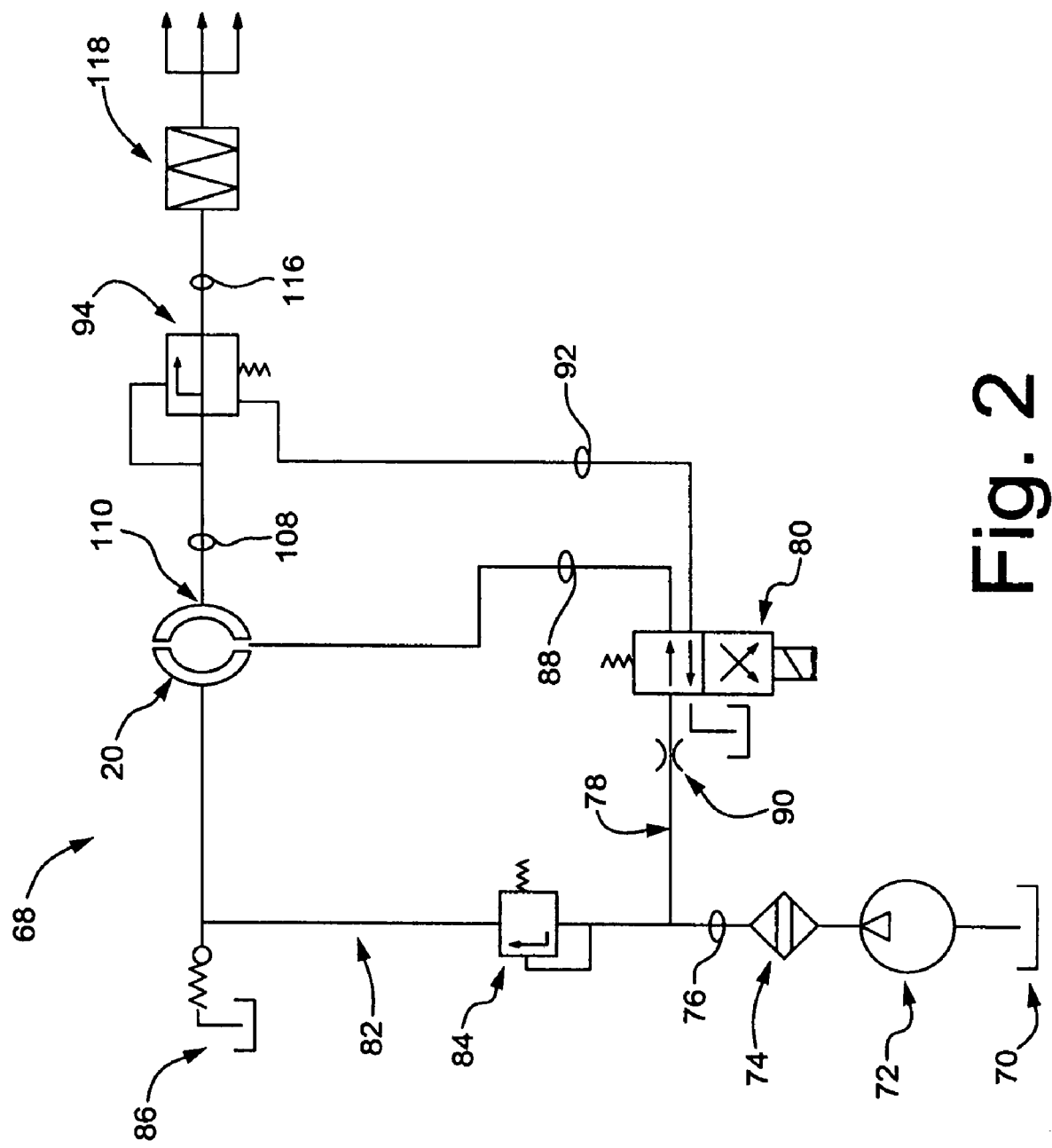
FIG. 2 is a schematic of a hydraulic circuit containing the torque converter of FIG. 1 as well as other components.

Turning now to FIG. 2, one embodiment of a hydraulic circuit 68 to implement the foregoing is depicted. A sump 70 is provided as a supply of fluid, such as oil. The fluid is drawn from the sump 70 via a pump 72. A filter 74 may be located downstream from the pump 72. The fluid pressure downstream of the filter 74 may be relatively high, for example approximately 20 bar.

A line 76 which depends from the filter 74 may branch into two sections downstream of the filter 74. A first section 78 delivers high pressure fluid to a lock-up clutch regulator control valve 80. The second section 82, which may have a valve regulator 84, is connected to the torque converter 20. A safety valve 86 may also be in the second section 82.

Two lines may depend from the lock-up clutch regulator control valve 80. The first line 88 leads from the lock-up clutch regulator control valve 80 to the torque converter 20. A restriction 90 may be located in the first section 78 between the filter 74 and the lock-up clutch regulator control valve 80. The restriction 90 may be calibrated to ensure only a predetermined amount of fluid is delivered to the torque converter 20. The amount of fluid desired to flow to the torque converter 20 is a function of the pressure in line 88, the torque converter pressure and the restriction 90. The lock-up clutch regulator control valve 80 and the restriction 90 being constants, it can be appreciated that the flow will vary according to the operating condition of the torque converter 20.

During the hydrodynamic condition, fluid flows through the first section 78, through the valve 80 to the torque converter 20. More specifically, the lock-up clutch regulator control valve 80 permits fluid to flow through the valve 80 and through the first line 88 where it enters the torque converter 20. Fluid entering the torque converter 20 in this manner provides sufficient fluid pressure in the torque converter 20 to separate the lock-up plate 58 from the impeller cover 24. During this process, the lock-up clutch regulator control valve 80 does not permit fluid into a second line 92, which depends from the valve 80.

When the machine or vehicle begins to operate at higher speeds, it may be desirable to lock up the torque converter 20 as described above. The lock-up clutch regulator control valve 80 is signaled to permit fluid from the first section 78 to flow into the second line 92 depending from the valve 80. The fluid flows through the second line 92 to a pressure control valve 94. At the same time, the valve 80 cuts off fluid to the first line 88. Any fluid in the first line 88 drains to a sump.

Turning now to FIGS. 3 and 4, a schematic version of the pressure regulator valve 94 is provided. As can be appreciated from FIG. 3, when little or no pressure is provided in the second line 92, such as during the above-mentioned hydrodynamic condition of the torque converter 20, a first piston 96 in the valve 94 remains biased against a first stop 98 in the valve 94 by a spring 100. The spring 100 similarly biases a second piston 102 within the valve 94 adjacent a second stop 104 adjacent an opposite end portion 106 of the valve 94.

A third line 108 connects the torque converter 20 to the pressure regulator valve 94. Fluid from the torque converter 20 applies pressure to the second piston 102. The second piston 102, being urged toward the second stop 104 by the spring 100, restricts or limits the flow of fluid from the third line 108 connected to an outlet 110 of the torque converter 20.

If the pressure of the fluid from the torque converter 20 in the third line 108 is sufficient, however, the fluid will overcome the spring force biasing the second piston 102 toward the second stop 104. The fluid will urge the second piston 102 toward a third stop 112. The third stop 112 is located between the first stop 98 and the second stop 104. Once the fluid has moved the second piston 102 a predetermined distance from the second stop 104 toward the third stop 112, an outlet 114 in the valve 94 leading to a fourth line 116 opens gradually more and more. The fluid is permitted to flow through the valve 94 and into the fourth line 116 where it is delivered to a fluid cooler 118.

When it is desired to place the torque converter 20 in a lock-up condition, the lock-up clutch regulator control valve 80 permits pressurized fluid to flow into the second line 92 to the pressure regulator valve 94. The valve 80 shuts off fluid to the first line 88. In the pressure regulator valve 94, the high pressure fluid, in combination with the spring 100, biases the first piston 96 away from the first stop 98 and toward the third stop 112 in the valve 94, as depicted in FIG. 4.

It can be appreciated that the first piston 96 compresses the spring 100, thus requiring a stronger fluid force from the torque converter 20 in the third line 108 to move the second piston 102 against the compressed spring 100. This causes the pressure in the torque converter to increase since the fluid in the torque converter cannot escape as readily as before.

The gradually increasing fluid pressure in the torque converter 20 gradually urges the lock-up plate 58 toward the impeller cover 24. Once a sufficiently high pressure in the torque converter 20 is reached, the lock-up plate 58 is placed in sufficient contact with the impeller cover 24 to lock the impeller cover 24 to the turbine hub 44.

It can be appreciated that the pressure in the torque converter 20 is not permitted to rise beyond a predetermined amount as fluid from the torque converter 20 communicates through the third line 108 to the valve 94 such that when it reaches a predetermined level, it will overcome the force of the compressed spring 100 in the valve 94 as well as the fluid pressure in the valve 94 from the second line 92. At the predetermined pressure level, the fluid from the torque converter 20 will flow through the valve 94 and into the fourth line 116 as described above.

FIGS. 3A and 4A depict a similar valve 94' similar to valve 94 depicted in FIGS. 3 and 4 and described above. Features in FIGS. 3A and 4A that are similar to or identical to those depicted in FIGS. 3 and 4 and described above are provided with a prime (') FIGS. 3A and 4A also have a few different features.

For example, as shown in FIGS. 3A and 4A, an accumulator 146' may be provided adjacent the first stop 98' and the first piston 96'. The accumulator 146' may assist in smoothly operating, such as in closing, the lock-up plate 58'.

FIGS. 3A and 4A also depict a restriction 144' in the second line 92'. The restriction 144' may be located upstream of the valve 94' to assist in smoothly operating, such as in closing, the lock-up plate 58'. The restriction 144' may be used separately from or in addition to the accumulator 146'.

Figure 5:
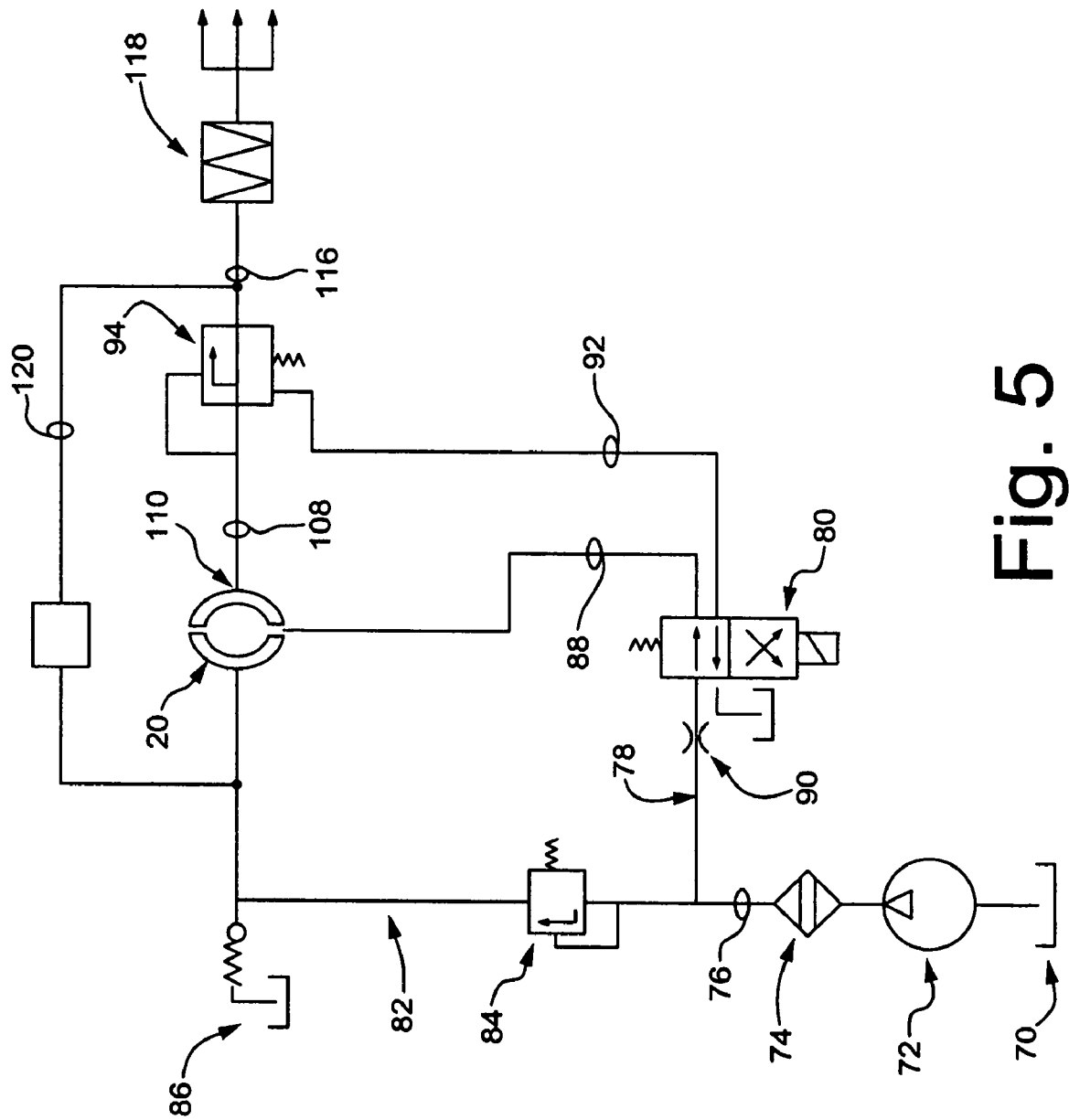
FIG. 5 is an alternative embodiment of the hydraulic circuit depicted in FIG. 2.

Turning now to FIG. 5, an alternative embodiment is depicted in which a torque converter fluid bypass line 120 extends from the fourth line 116 to the second section 82. As can be appreciated by the foregoing discussion, the pressure in the line 82 can be high, particularly during the lock-up condition. The pressure may approach the opening pressure for any safety valve 86 in the circuit 68. To ensure the fluid is not unnecessarily exhausted from the circuit 68, the bypass line 120 can redirect the fluid into the line 116 as shown.

Turning now to FIGS. 6 and 7, another embodiment of a pressure regulator valve 122 is depicted. A single double headed piston 124 along with a spring 126 is located within the valve 122. A first end portion 128 of the spring 126 abuts a first end portion 130 of the valve 122 and a second end portion 132 of the spring 126 abuts a first piston head 134.

A second piston head 136 selectively abuts a second end portion 138 of the valve 122. The heads 134, 136 are connected by a body portion 140. The body portion 140 may have a decreased diameter as compared to either the first piston head 134 or the second piston head 136 to permit a fluid to flow around this section.

The first end portion 130 of the valve 122 is connected to the second line 92 from the lock-up clutch regular control valve 80. The valve 122 is also connected to the fourth line 116 leading to the cooler 118. The outlet 110 of the torque converter 20 is also connected to the valve 122 via the third line 108.

In the hydrodynamic condition of the torque converter 20, no fluid is provided in the second line 92. The spring 126 biases the piston 124 toward the second end portion 138 of the valve 122. The first piston head 134 blocks the third line 108, thus fluid cannot flow out of the torque converter 20. FIG. 7 depicts this condition.

It can be appreciated from the figures that a fluid line 142 connects the third line 108 with the second end portion 138 of the valve 122. If the pressure in the torque converter 20 rises to a predetermined level, the fluid will travel through the fluid line 142 to the second end portion 138 of the valve 122 where, under the correct pressure, it will move the piston 124 toward the first end portion 130 of the valve 122. Fluid at a predetermined pressure is thus permitted to flow from the torque converter 20 through the valve 122 to the fourth line 116. FIG. 6 depicts this condition.

In the lock-up condition of the torque converter 20, pressurized fluid is provided in the second line 92 by the lock-up clutch regulator control valve 80. The pressurized fluid, in addition to the spring 126, urges the piston 124 to the second end portion 138 of the valve 122. The valve 122 thus restricts, or prevents, fluid from leaving the torque converter 20 until higher pressure is reached in the torque converter 20.

Fluid pressure in the torque converter 20 increases causing the lock-up plate 58 to bias toward, and gradually come in contact with, the impeller cover 24 to lock-up the torque converter 20.

As mentioned above, a fluid line 142 connects the third line 108 with the second end portion 138 of the valve 122. As pressure in the torque converter 20 continues to rise in the lock-up condition, fluid from the third line 108 communicates through the fluid line 142 to the second end portion 138 of the valve 122. At a predetermined pressure, the fluid in the fluid line 142 has sufficient pressure to overcome the biasing force of the spring 126 and the fluid entering the valve 122 through the second line 92 so that the piston 124 moves toward the second end portion 138 of the valve 122. In this manner, a predetermined quantity of fluid is permitted to escape from the torque converter 20, but only at a predetermined pressure. Typically, this pressure is greater than the torque converter pressure required to lock-up the lock-up plate 58 and the impeller cover 24.

Those skilled in the art will appreciate that the accumulator and the restriction described above and depicted in FIGS. 3A and 4A may also be added to the valve 122 described above and depicted in FIGS. 6 and 7.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of controlling a torque converter comprising:
    providing a hydraulic circuit having a first line, a second line, a lock-up clutch regulator control valve, a pressure regulator valve and a torque converter; and
    utilizing said lock-up clutch regulator control valve to selectively direct fluid to said torque converter to cause a hydrodynamic condition in said torque converter or to selectively direct fluid to said pressure regulator valve, also connected to said torque converter, to control a lock-up condition in said torque converter;
    wherein during said hydrodynamic condition said lock-up clutch regulator control valve directs fluid to said torque converter to separate a lock-up plate from an impeller cover, said lock-up clutch regulator valve directing no fluid to said pressure regulator valve; and wherein during said lock-up clutch condition said lock-up clutch regulator control valve directs fluid to said pressure regulator valve to increase pressure in said torque converter so that said lock-up plate is urged onto said impeller cover, said lock-up clutch regulator control valve directing no fluid to said torque converter to separate said lock-up plate from said impeller cover.

2. The method of claim 1, wherein during said lock-up clutch condition, said fluid from said lock-up clutch regulator control valve causes a first piston in said pressure regulator valve to compress a spring, said spring, in combination with said fluid, biasing a second piston to selectively restrict an outlet for fluid from said torque converter so that a predetermined pressure is reached in said torque converter.

3. A method of controlling a torque converter comprising:
providing a high pressure fluid to a lock-up clutch regulator control valve;
utilizing said lock-up clutch regulator control valve to selectively direct said high pressure fluid to a torque converter or to a pressure regulator valve;
wherein when said high pressure fluid is directed to said torque converter, a hydrodynamic condition in said torque converter is achieved in which a lock-up clutch plate in said torque converter is prevented from engaging with an impeller cover of said torque converter; and
wherein when said high pressure fluid is directed to said pressure regulator valve, said pressure regulator valve selectively restricts an outlet for fluid from said torque converter so that a fluid pressure in said torque converter increases to a predetermined level causing said clutch plate to move into engagement with said impeller cover.

4. The method of claim 3, wherein upon receipt of said high pressure fluid, a first piston in said pressure regulator valve compresses a spring, said spring, in combination with said high pressure fluid, urging a second piston in said pressure regulator valve to selectively restrict said outlet in said pressure regulator valve to increase said fluid pressure in said torque converter.

5. The method of claim 3, wherein during said hydrodynamic condition, said lock-up clutch regulator control valve does not permit said fluid to flow from said lock-up clutch regulator control valve to said pressure regulator valve and when said lock-up clutch regulator control valve directs fluid to said pressure regulator valve, said lock-up clutch regulator control valve does not permit said fluid to flow from said lock-up clutch regulator control valve to said torque converter.

6. A method of controlling a torque converter comprising:
providing a torque converter with an impeller cover and a lock-up clutch plate, said lock-up clutch plate being designed to selectively engage said impeller cover to lock said plate and said cover together;
connecting a lock-up clutch regulator control valve to a source of high pressure fluid with a flow restrictor being located upstream of said lock-up clutch regulator control valve;
providing a first line connected from said lock-up clutch regulator control valve to said torque converter;
connecting a pressure regulator valve in a second line between said lock-up clutch regulator control valve and said torque converter; and
utilizing said lock-up clutch regulator control valve to selectively direct fluid into said first line or into said second line;

wherein to cause a hydrodynamic condition in said torque converter, said lock-up clutch regulator control valve directs fluid into said first line causing said lock-up clutch plate and said impeller cover to separate from one another; and
wherein to cause a lock-up clutch condition in said torque converter said lock-up clutch regulator control valve selectively directs fluid to said pressure regulator valve.

7. The method of claim 6, wherein said lock-up clutch plate has a first end portion and a second end portion, said first end portion having a friction portion thereon that selectively engages said impeller cover, said second end portion capable of axial movement.

8. The method of claim 7, wherein during said hydrodynamic condition fluid enters said torque converter at least two ways by flowing between a stator and an impeller hub and between said lock-up clutch plate and said impeller cover and all fluid leaves said torque converter between a turbine hub and said stator.

9. The method of claim 7, wherein during a lock-up condition, said lock-up clutch plate is selectively pushed against said impeller cover, thus locking said impeller cover, said turbine hub together, by increasing fluid pressure in said torque converter via said pressure regulator valve selectively preventing fluid from said torque converter from escaping.

10. The method of claim 9, wherein fluid in said second line urges a first piston within said pressure regulator valve to compress a spring within said pressure regulator valve, said compressed spring and said fluid urging a second piston within said pressure regulator valve to move towards an end-stop in said pressure regulator valve.

11. The method of claim 10, wherein said second piston within said pressure regulator valve and said spring cause fluid pressure to build within said torque converter by selectively restricting an outlet in said valve until a predetermined pressure in said torque converter is reached.

12. The method of claim 11, wherein when said pressure in said torque converter reaches said predetermined pressure, said second piston overcomes said compressed spring and moves within said pressure regulator valve to permit fluid from said torque converter to be released through said pressure regulator valve to a fluid cooler.

13. The method of claim 6, wherein said high pressure fluid is taken from a high pressure zone in a hydraulic circuit located between a pump and a valve regulator.

14. The method of claim 6, wherein during said lock-up condition said lock-up clutch regulator control valve permits said fluid to enter said second line to the exclusion of said fluid entering into said first line.

15. The method of claim 6, wherein said pressure regulator valve permits fluid pressure in said torque converter to gradually increase to cause said lock-up plate to gradually engage said impeller cover.

16. The method of claim 6, wherein a fluid by-pass line connects a torque converter input line with an outlet line of said pressure regulator valve.

17. The method of claim 6, wherein said pressure regulator valve has a single piston with a first and a second head and where a spring is biased against said first head, said spring and said fluid pressure from said lock-up clutch regulator control valve urging one of said heads to selectively prevent fluid from leaving said torque converter during said lock-up clutch condition causing said pressure in said torque converter to increase so that said lock-up clutch plate engages with said impeller cover.

* * * * *